United States Patent [19]

Battle

[11] 4,061,902

[45] Dec. 6, 1977

[54] DIGITAL TRAFFIC COORDINATOR

[75] Inventor: Francis L. Battle, Davenport, Iowa

[73] Assignee: Gulf & Western Industries, Inc., New York, N.Y.

[21] Appl. No.: 663,580

[22] Filed: Mar. 3, 1976

[51] Int. Cl.² .............................................. G06F 15/48

[52] U.S. Cl. .................................... 364/436; 307/203; 340/41 R

[58] Field of Search ................... 307/203; 235/150.24; 340/41 R

[56] References Cited

U.S. PATENT DOCUMENTS 3,525,980 8/1970 Schmidt et al. ........................ 340/41

*Primary Examiner*—R. Stephen Dildine, Jr.

*Attorney, Agent, or Firm*—Meyer, Tilberry & Body

[57] ABSTRACT

There is provided a coordinator for creating a desired background cycle time and controlled logic conditions on selected output circuits during the background cycle which cycle and logic conditions are used in governing the signalization of a traffic intersection. This coordinator includes a pulse counter for counting between 0 and 99 upon receipt of counting pulses and having output means for creating a distinct signal upon counting to each digit in the range of 0 to 99. There is further provided means for controlling the frequency of the counting pulses to a frequency equal to one hundred divided by the time of a desired background cycle in seconds and decoding means for creating the selected logic conditions in output circuits when the counter counts to a selected number in the range of 0 to 99.

28 Claims, 10 Drawing Figures

(OUTPUT ORING)

$T = R_1 + S_1$

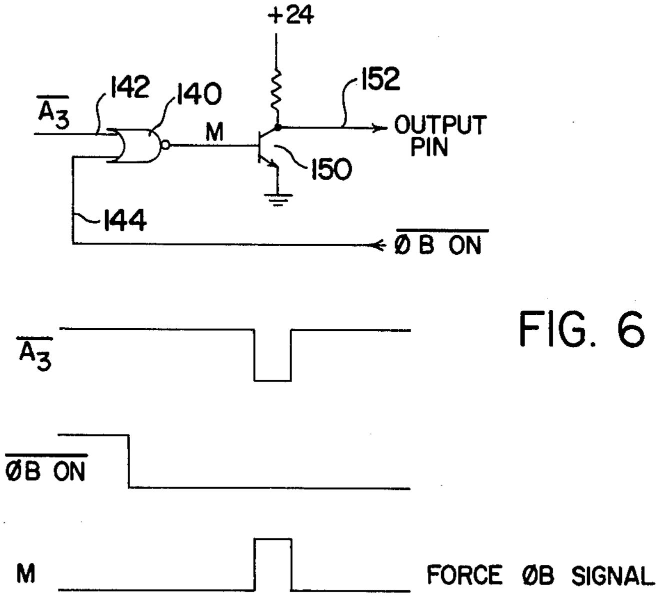
FIG. 6
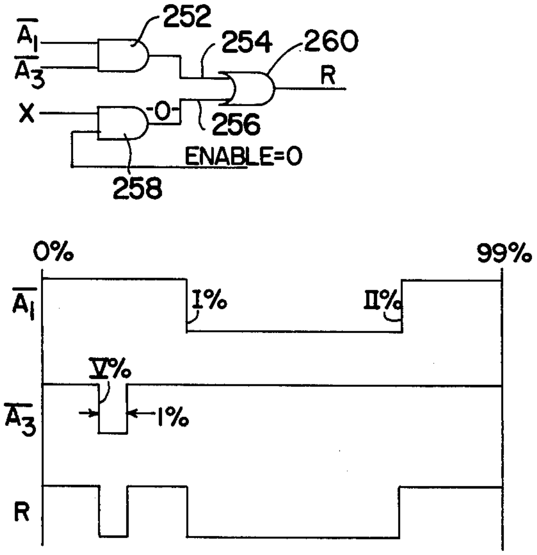
FIG. 7
FIG. 8
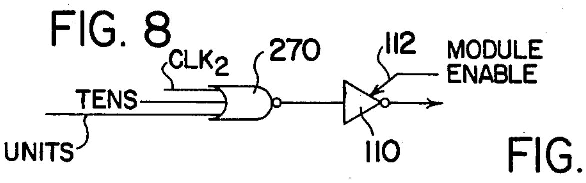
FIG. 9
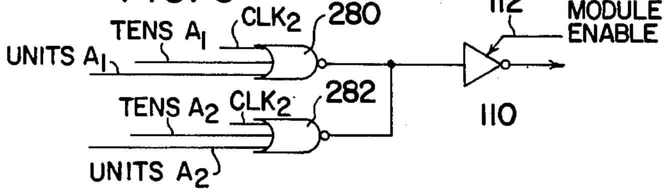

DIGITAL TRAFFIC COORDINATOR

This invention relates to the art of traffic control devices and more particularly to a coordinator for coordinating the signalization at a given intersection in a controlled traffic system.

The invention is particularly applicable for use in coordinating a multiphase traffic flow pattern at a given intersection which is controlled from a remote master controller and it will be described with particular reference thereto; however, it is appreciated that the invention has broader applications and may be used as a coordinator for various traffic control systems.

As is well known, traffic control systems often employ a master controller which can control the signalization at numerous intersections within a network or pattern of related traffic flow. Generally these systems utilize a coordinator at each intersection which determines the background cycle length of the signalization and certain programmed functions for the intersection. The master controller provides control information to the coordinator which, in turn, regulates the local controller in accordance with this and other input information. These coordinators include a means for determining the cycle length for processing the total signalization at the intersection. In addition, outputs from the coordinator control certain functions at the local intersection. Generally, this type of system requires a means for providing a selected offset of one intersection with respect to other intersections. Offset allows flow in a more efficient manner along a continuous traffic flow pattern. For instance, at certain times during the day or during certain traffic conditions, it is necessary to change the offset at different intersections. To do this, a master synchronization pulse is created at the master controller. Each of the intersections then employs a selected time delay after the master pulse before its signalization cycle is initiated. As traffic conditions change, the offset is changed by the master controller to optimize traffic flow. This type of coordinated system is well known and is generally in use in traffic control systems.

The first type of system to perform the offset function and other coordination functions was an electro-mechanical device which included a rotating shaft carrying several cams. The shaft was driven by a motor the speed of which determined the cycle length. When an offset was to be created, the cam shaft was held in the starting position until an offset time delay released the cam shaft in the coordinator. The various functions to be performed by the coordinator were not easily adjusted. The cams had to be changed or modified to produce different signalization patterns or programs at the individual intersections. This could not be done by a traffic engineer without substantial work at the coordinator. In addition, it was generally necessary to produce successive non-overlapping output pulses from the coordinator. The available programming was limited by the small number of cams. Thus, the electro-mechanical coordinator was quite limited and the more advanced control concepts could not be provided conveniently. Adjustments were difficult. To overcome some of these disadvantages, a plurality of pins were used on a driven shaft. These pins could be changed more easily than cams; however, they did not provide for overlapping control functions at the output of the coordinator. Also adjustment of the outputs was somewhat complex and advanced signalization concepts were somewhat difficult to employ. The outputs from the coordinator were somewhat limited in number and did not allow for a large range of easily adjustable output control signals or a complex control program.

These and other disadvantages have been overcome by the present invention which relates to a digital coordinator which has a plurality of outputs which can be adjusted over a wide range by a simple externally mounted arrangement.

In accordance with the present invention, there is provided a coordinator of the type described above for creating a background cycle time and controlled logic conditions for selected output circuits, which coordinator includes a pulse counter for counting between 0 and 99 upon receipt of counting pulses and having output means for creating a distinct signal upon counting to each of the digits in the range of 0 to 99. The coordinator also includes means for controlling the frequency of the counting pulses to a frequency of one hundred divided by the time of the desired background cycle in seconds and decoding means for creating the selected output logic conditions in the output circuits when the counter counts to a selected number in the range of 0 to 99.

In this manner, there is created a background cycle which is advanced by a selected percentage between 0 and 99. The background cycle is divided into 100 increments representing percentages of the background cycle irrespective of its adjusted time. The cycle time can be adjusted by changing the input counting frequency to the pulse counter. By providing the number decoding circuits as required for a given signalization program, a substantial number of output pulses can be created.

In accordance with another aspect of the present invention, the output circuits are separate so that they can overlap in the background cycle time frame and are generally controlled by external pulses or signals to provide output pulses or signals only when required. Several output circuits can be provided in modules which may be standardized. By using two or more modules for a single program and controlled by a single timer, a large number of various outputs can be created. If additional programs are needed, additional sets of programmed output modules can be provided with module selecting signals.

The primary object of the present invention is the provision of the coordinator for a traffic control system, which coordinator is digital in operation, produces an expandable background cycle and allows a large number of easily variable output pulses or signals.

Another object of the present invention is the provision of a coordinator for a traffic control system, which coordinator allows independent control of the output pulses or signals in a manner that does not preclude overlapping of the pulses or signals.

Yet another object of the present invention is the provision of a coordinator as defined above, which coordinator allows selection of either a high or a low logic condition at the output and incorporates provisions for selectively inhibiting output signals or pulses by external conditions.

Still a further object of the present invention is the provision of a coordinator as defined above, which coordinator has an expandable cycle length which is controlled by changing the counting frequency of a digital counter by using divider circuits.

Another object of the present invention is the provision of a coordinator as defined above, which coordinator is digital and includes an expandable background cycle and outputs positioned in time relationship based upon cycle time percentages.

A further object of the present invention is the provision of a coordinator as defined above, which coordinator employs output program modules that can be standardized and preprogrammed.

These and other objects and advantages will become apparent from the following description taken together with the accompanying drawings in which:

FIG. 6 is a logic and wiring diagram illustrating one output function of the preferred embodiment and including a graph illustrating this function;

FIG. 7 is a schematic logic diagram illustrating another output function of the preferred embodiment and graphs illustrating operating characteristics thereof;

FIG. 8 is a schematic logic diagram illustrating still a further output concept employed in the preferred embodiment of the present invention; and, FIG. 9 is still a further output arrangement which can be employed in the preferred embodiment of the present invention.

Figure 1:
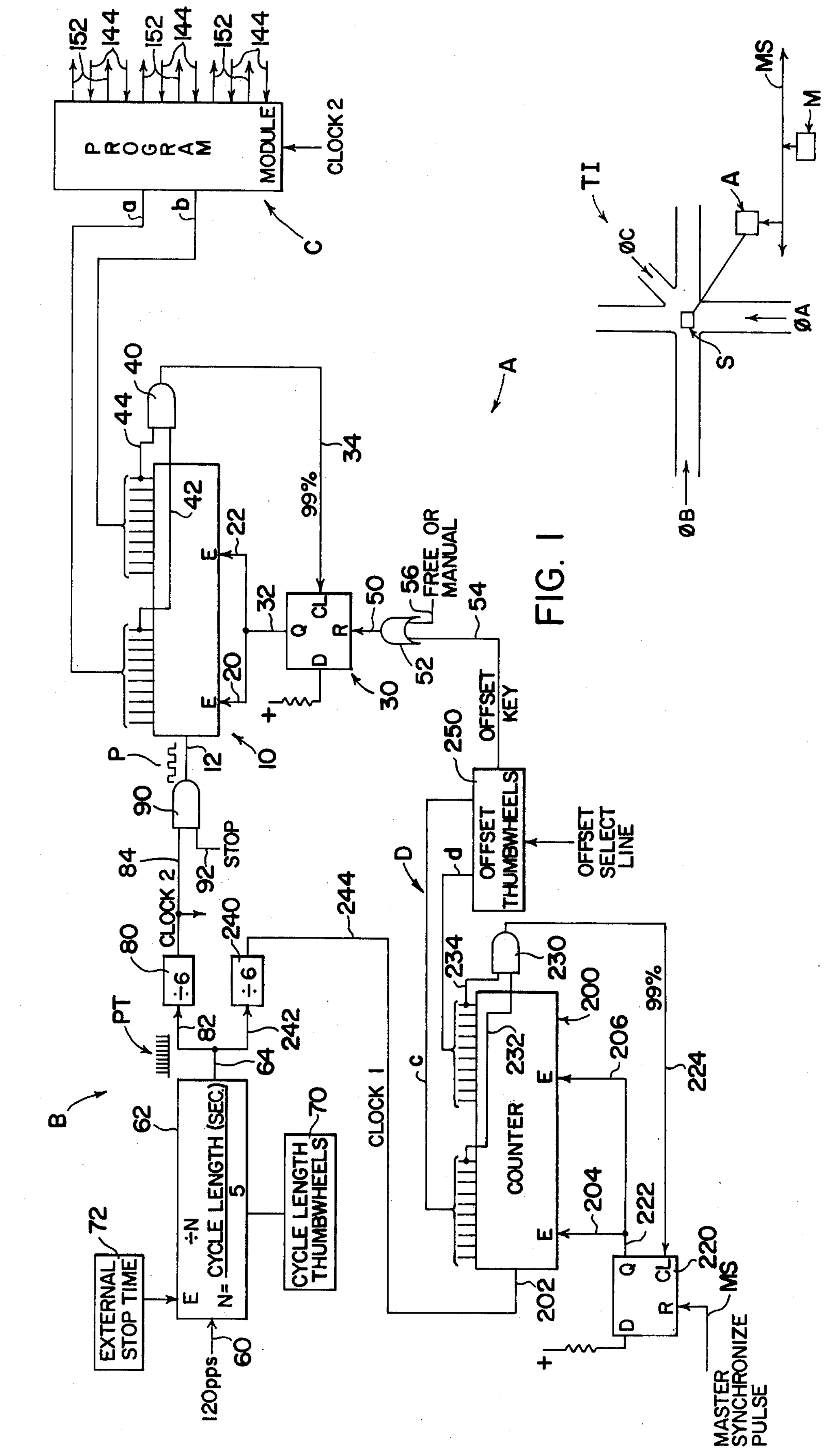
FIG. 1 is a schematic logic diagram illustrating the preferred embodiment of the present invention.

Referring now to the drawings wherein the showings are for the purpose of illustrating a preferred embodiment of the invention only, and not for the purpose of limiting same, FIG. 1 shows a coordinator A used to control a traffic signal S at a traffic intersection TI. This schematically illustrated intersection includes a number of separate traffic phases which vary according to the configuration of the intersection and are shown only for the purposes of illustrating a representative type of intersection to be controlled by the coordinator A. A master control unit M remotely located with respect to the intersection includes certain output lines which can direct a master synchronization pulse, offset select signal and other pulses to the various coordinators located at the intersection. A variety of traffic system configurations can employ a coordinator constructed in accordance with the present invention. In the preferred embodiment, coordinator A includes a driving circuit B, a programmed output circuit or module C and an offset control circuit D which receives the master synchronize pulse MS from master controller M.

Referring now to FIG. 1, a main cycle length pulse counter 10 is provided with two stages. The first stage counts between 0–9, as units, and the second stage counts between 0–9 as tens. These two counters are connected in decade so that counter 10 counts between 0 and 99 as pulses are received at input 12. Counter 10 can roll over to all zeros after 99 and continue the cycle length counting for a new cycle. However, in the preferred embodiment when 99 has been reached, counter 10 is inhibited until again started for the next cycle. Thus, counter 10 produces one hundred output pulses for each background cycle, which divide the background cycle into 100 equal parts or percentages. Thus, the 100 increments are designated as cycle length percentages. In the illustrated embodiment the group of leads *a* is designated tens and the group of leads *b* is designated units to produce the 0 to 99 output. Thus, the logic on leads *a*, *b* is a binary coded logic which changes at each one percent increment during the background cycle. Of course, other increments could be used for dividing the output of counter 10. For instance, the increment could be ½%, ¼%, 2%, etc. This would change the required driving frequency. Counter 10 is enabled by two lines 20, 22 which are controlled by a dual stage unit such as flip-flop 30. This provides an arrangement for stopping the counter 10 at the end of its counting function when the output reaches the binary coded designation for the number 99. This flip-flop can be considered as a shifting unit for shifting counter 10 back into the 0 position for the next successive cycle timing function. Flip-flop 30 includes a D terminal connected to a positive power supply thus presenting a logic 1 at this terminal. The Q line 32 is connected to enable lines 20, 22 so that when a logic O appears in line 32, the two counter banks in counter 10 are enabled. A clock line 34 for flip-flop 30 receives a pulse when the output of counter 10 reaches the number 99. This can be provided by various arrangements. In the illustrated embodiment, an AND gate 40 has inputs 42, 44 connected to the 9 line of both counter sections to produce clocking logic when counter 10 reaches 99. This gates the logic 1 from terminal D to terminal Q of flip-flop 30. The reset line 50 for flip-flop 30 is controlled by an OR gate 52 which either receives an offset key or pulse in input 54 to reset the flip-flop or a logic on line 56 which prevents the clocking pulse from stopping counter 10. The logic on line 56 is controlled by a manual switch or switches on coordinator A, which indicate that the coordinator is in free or manual operation. Under normal circumstances, the logic 0 appears in line 56 and the coordinator A is controlled by the offset control circuit D.

As pulses P appear at input 12, counter 10 counts between 0 and 99. At the 99 coded logic in lines *a*, *b*, flip-flop 30 is clocked to block further operation of counter 10. This resets the counter to 0% awaiting a pulse in line 32 created by gate 52 upon receipt of an offset key in lline 54. When an offset key is created by the offset control circuit D, flip-flop 30 is reset and counter 10 commences to count the next cycle for signalization by the program module C.

Referring now to driving circuit B of coordinator A, this circuit includes a pulse input 60 which receives 120 pulses per second which can be created by standard line frequency of 60 cycles and a full rectifier with a pulse shaping circuit. The pulses on input 60 are divided by digital divider circuit 62, which has a dividing function N. In the illustrated embodiment, using 60 cycle, the dividing function N is the cycle length in seconds divided by the number 5. This produces a pulse train in output 64 which is 600 divided by the cycle length in seconds. The dividing number N is controlled by an appropriate circuit such as thumbwheel device 70 which is adjusted to read at the panel of coordinator A in cycle length time in seconds. Thus, the cycle length can be adjusted by five second intervals over a wide range of desired cycle lengths for the particular intersection being controlled by coordinator A. Thumbwheel selecting circuit 70 then controls the dividing funtion N in divider circuit 62. If an external stop time is desired, this can be controlled by a unit 72 which inhibits the operation of divider 62. The stop time can be received by coordinator A from the master controller or from other sources. Pulse train PT in output 64 is then divided by the number 6 in divider 80, having an input 82 connected to output 64 and an output 84 which is designated as the second clock. This clock has a frequency of 100 divided by the cycle length in seconds. If the available driving line frequency were 50 cycles per second, the input 60 would receive 100 pulses per second. Thus, the output 64 would have the frequency of 500 divided by the cycle length in seconds. In this instance, divider 80 would divide by 5 to produce the second clock in line 84. An AND gate 90 gates the second clock to the input 12 of cycle length counter 10. If it is desirable to stop the counter, this can be done by an appropriate input 92 for gate 90. Of course, gate 90 can be eliminated and pulses P can be directed from divider 80 to counter 10.

In operation, the driving circuit causes counter 10 to create 100 pulses during the time set in thumbwheel device 70. Thus, the selected cycle length time is divided by counter 10 into 100 equal increments which therefore divides the logic shifting in output lines *a, b* into 100 separate increments which appear as decimal coded binary information in these lines. This binary coded information is then directed into programmed output module C which is shown in more detail in FIG. 2.

Figure 2:
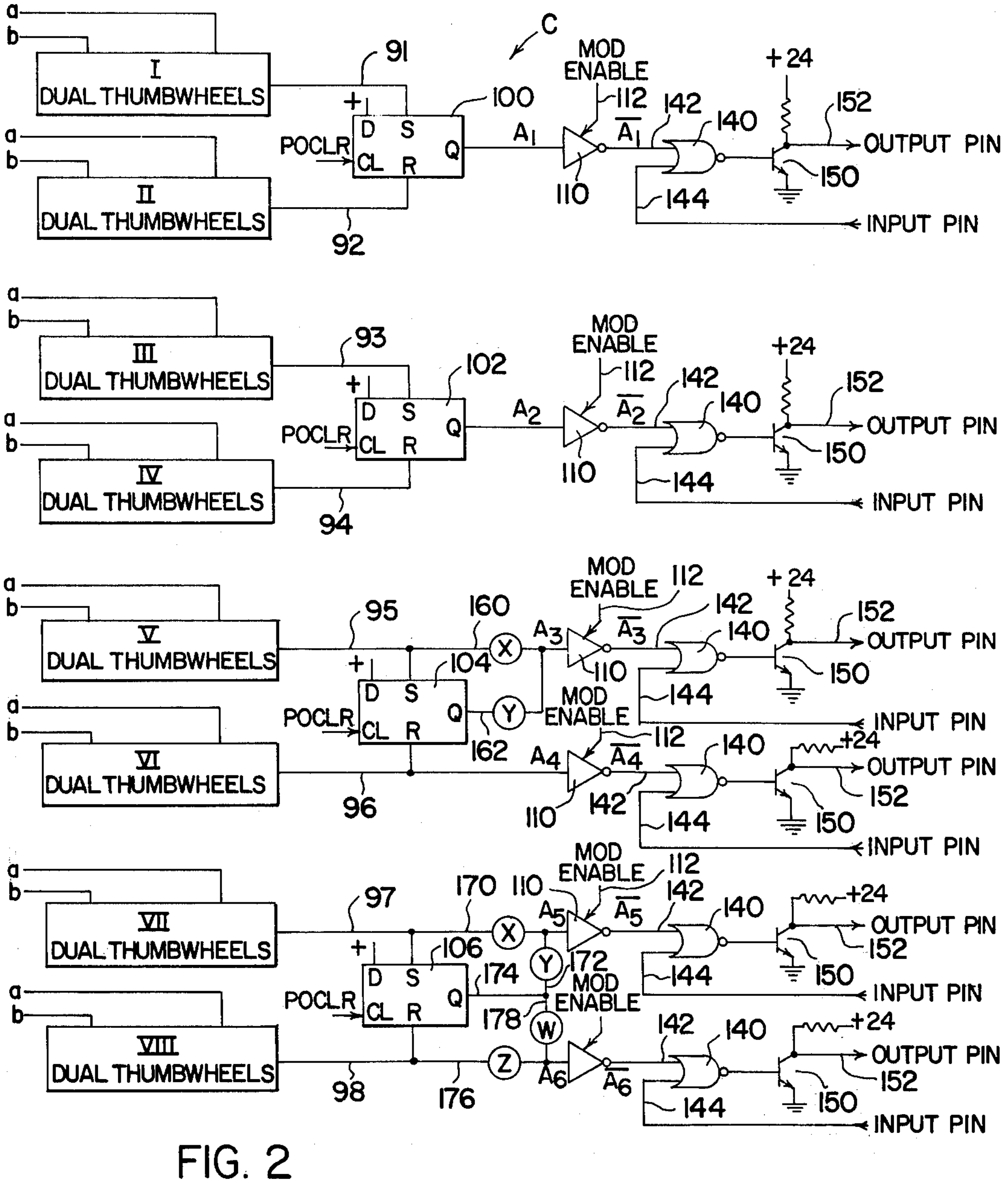
FIG. 2 is a partial wiring and logic diagram illustrating an output module used in the preferred embodiment.

Referring now to FIG. 2, the thumbwheel units I-VIII decode the logic information on lines *a, b,* and produce output pulses in lines 91–98, respectively, when the percentage set in the thumbwheel units is created on the binary coded lines *a, b.* The logic on lines 91–98 are zero pulses when the set percentages have been decoded by the thumbwheel devices. This logic information can be used in a variety of ways by the programmed output module C. It can be used directly, as shown in FIG. 6, or indirectly as shown in FIG. 2. In the latter instance, the program module C includes a plurality of dual state control devices, shown as flip-flops 100–106. These flip-flops each include a D terminal connected to a logic 1, an S terminal which sets the flip-flop to logic 1, a reset terminal R which resets the flip-flop to a logic 0 and an output Q terminal. In addition, a power on clearing line, POCLR, is connected to the clocking terminal of the flip-flops. Thus, when the power is initially applied to coordinator A, the flip-flops are clocked to produce a logic 1 in output Q. Thereafter the D terminal and clocking terminal are inactive until the next initial turn on of the coordinator. The flip-flops are connected in various manners to output lines $A_1$–$A_6$. These lines control tri state gates 110 in the output module. Gates 110 are controlled by a module enable line 112 which receives an enabling logic when the particular output module is being used for a selected program. In practice, several output modules can be used with separate and distinct programmed outputs. At the front panel of coordinator A, the various separate programs can be manually or remotely selected. When the program selection is made, a logic is applied to lines 112 of the particular programmed modules being employed. In practice, three separate modules are used for each program. Thus, the enabling lines 112 of three separate modules are energized at any one time. Of course, various modules could be used for each program and various numbers of programs could be employed in the coordinator. This shows the versatility of coordinator A. The output lines from the modules are then connected to output terminals on the coordinator connector, not shown. By using the enabling lines 112, one group of modules comprising a single program can be connected at any instance to the input and output terminals of the input/output connector for coordinator A. This produces multiplexing of the various programs within the coordinator. Another program is selected by energizing enabling lines 112 of the modules used in the other program. These modules are connected to the same terminals on the input/output connector which, in practice, has 18 input pins and 18 output pins and can accommodate three program modules of the type shown in FIG. 2.

Figure 5:
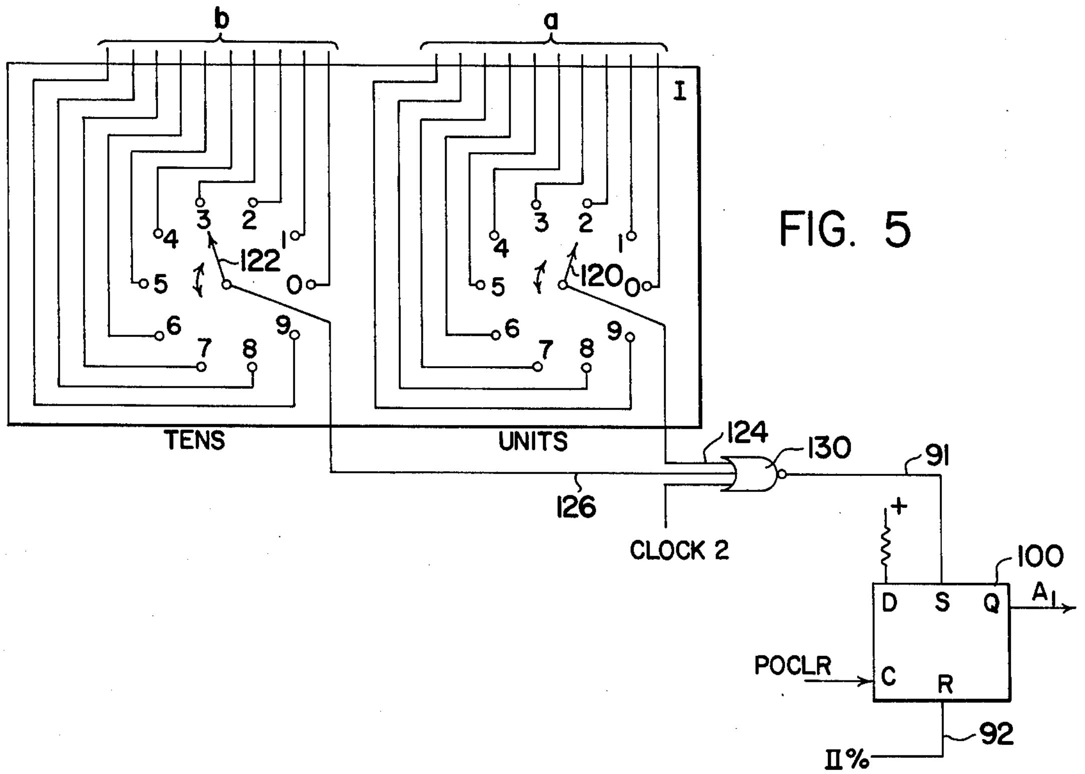
FIG. 5 is a schematic diagram showing the output decoding arrangement used in the preferred embodiment of the present invention.

A more detailed description of the thumbwheel unit contemplated in the preferred embodiment of the invention is illustrated in FIG. 5. Thumbwheel unit I is illustrated; however, the other units are essentially the same. Movable contacts 120, 122 are rotated by a thumbwheel, not shown, to the various contact positions 0–9 of the units and tens decoding networks. These contacts are movable by separate thumbwheels so that any percentage, in units and tens can be selected by each thumbwheel unit I–VIII. A decoded output appears in lines 124, 126 which are inputs of a NOR gate 130. The other input is the second clock. When all inputs to gate 130 are a logic 0, indicating that counter 10 has progressed to the percentage set in thumbwheel unit I, a logic 1 appears in line 91. This sets flip-flop 100 to a logic 1 to produce a logic 1 in output line $A_1$. The other thumbwheel units operate in the same manner to produce a logic 1 in each of the lines 91–98 when the set percentage is reached. The various flip-flops 100–106 can be connected in different output configurations, as shown in FIG. 2.

Figure 3:
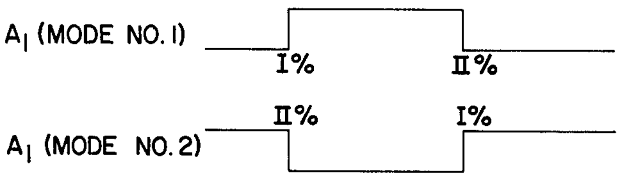
FIG. 3 is a graph showing certain operating characteristics of the system shown in FIGS. 1 and 2.

Referring first to flip-flops 100, 102, these flip-flops are arranged to produce a signal in lines $A_1$, $A_2$, respectively. This signal has a length determined by the setting of two separate thumbwheel units. Flip-flop 100 is controlled by thumbwheel unit I and thumbwheel unit II. In a like manner, flip-flop 102 is controlled by thumbwheel unit III and thumbwheel unit IV. Referring now to the operation of flip-flop 100, which is essentially the same as the operation of flip-flop 102, when the percentage in coded lines *a, b,* reaches the value of thumbwheel unit I, flip-flop 100 is set to produce a logic 1 in output $A_1$. When the percentage manually adjusted in flip-flop unit II is reached, a logic 1 appears in line 92 to reset flip-flop 100 to a logic 0 producing a logic 0 in line $A_1$. The output of gate 110 then controls output NOR gate 140 having an input 142 carrying the $\overline{A_1}$ logic and an input 144 carrying an input logic from an input pin connected to the connector of coordinator A. When an enabling logic 0 appears at the input pin controlling line 144, gate 140 is released for control by the logic $\overline{A_1}$ at line 142. This produces the desired logic in output 146 of gate 140 to control transistor 150 and output line 152 connected to an output pin of the coordinator. The output and input pins have a ground true logic. As illustrated, when gate 140 is enabled, the output of the pin connected to line 152 is controlled by the logic of flip-flop 100. This is shown in FIG. 3. The logic on line $A_1$ shifts to a logic 1 at the percentage in unit I. Thereafter it returns to a logic 0 at the percentage set in thumbwheel unit II. This is shown in the first mode of operation of FIG. 3. Of course, by adjusting the percentages, an inverted pulse could be provided, as shown in the second mode of operation of FIG. 3. In that arrangement, the second thumbwheel unit II starts the signal or pulse and the first thumbwheel unit I stops the signal or pulse. Of course, in each instance, an enabling pulse must be received in the input pin controlling line 144. Thus, the present invention relates to an arrangement whereby input information is used to control output information. If the program requires no control information and signals are needed irrespective of an input condition, it is possible to ground line 144. As shown in FIG. 3, the two flip-flops 100, 102 can create a signal having a length determined by the percentage setting of two adjacent thumbwheel units. Thus, irrespective of the length of the cycle time, the percentages remain fixed for the output pulses or signals.

Figure 4:
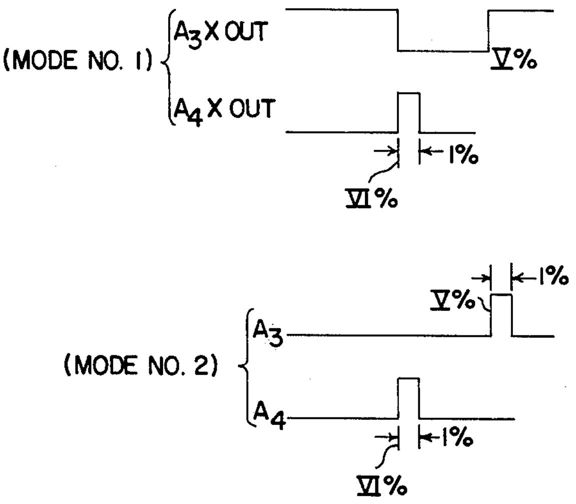
FIG. 4 is a graph showing additional operating characteristics of the preferred embodiment of the present invention.

Referring now to the flip-flop 104, another arrangement is employed for creating outputs from the module. In this arrangement, lines 160, 162 are added with areas X, Y for drilling or other electrical disruption. By disrupting line 160, one operation is obtained. By disrupting line 162, another operation is obtained. This is shown in mode No. 1 of FIG. 4. With the portion X removed in line 160, $A_3$ shifts between a logic 0 and a logic 1 in a manner similar to flip-flops 100, 102. At the same time, a one percentage pulse is created in line $A_4$ at the percentage setting of thumbwheel unit VI. The second mode of operation is obtained by interrupting line 162 at area Y. In this instance, flip-flop 104 has no function and a one percent pulse is created in lines $A_3$, $A_4$ at the percentage setting of thumbwheel units V, VI, respectively.

Still a further type of output arrangement is illustrated for flip-flop 106. In this instance, lines 170, 172, 174, 176 and 178 are provided with interrupting areas W, X, Y and Z. Either a one percent pulse or pulses having lengths determined by the setting of thumbwheel units VII, VIII can be obtained in the outputs $A_5$, $A_6$. To produce a single output pulse having a length of one percent and an output pin controlled by a line 152, the arrangement illustrated in FIG. 6 will he hereinafter described.

Referring again to FIG. 1, the offset selection circuit D produces an offset key in line 54 at a predetermined time delay after the master synchronizing pulse in line MS. The desired offset can be selected from a signal created by the master controller based upon time and/or traffic conditions. In accordance with the illustrated embodiment, the offset control circuit D includes offset selection pulse counter 200, which is the same as counter 10. This counter has output line groups *c*, *d* and enabling lines 204, 206. The coded lines of groups *c*, *d* are connected to a thumbwheel selecting network 210. This network includes, in the preferred embodiment, three separate selected settings for different selectable offsets in percentages. A signal from the master controller determines which of the thumbwheel units is activated at any given time to select the desired offset for counter 10. A flip-flop 220 similar to flip-flop 30 of counter 10 controls the operation of counter 200. This flip-flop includes a D terminal latched ot a logic 1 and a Q output line 222 for controlling the reset lines 204, 206. A clock line 224 is pulsed at the number 99. The reset line 224 is controlled by an AND gate 230 having inputs 232, 234 in the same operation as lines 42, 44 of gate 40. A reset pulse is received at a master synchronize pulse in line MS. When this pulse occurs, a logic 0 is applied to lines 204, 206 by line 222. In this manner, counter 200 starts to count pulses received at input 202 from divider 240. This divider has the same dividing number as divider 80 and has an input 242 connected to output 64 of divider 62. Output 244 carries the first clock to the input of counter 200. As can be seen, the counting frequency of counters 10, 200 are the same. If a 50 cycle line current were used, dividing circuit 240 would divide by five. In the preferred embodiment, the circuit divides by six. In operation, the master synchronizing pulse is received in the MS line. This starts counter 200 which counts to a thumbwheel setting in offset thumbwheel unit or network 250. The particular thumbwheel unit being used is controlled by an offset select line controlled by the master controller. In other words, three or more offset thumbwheels are adjusted in percentages. Each of these thumbwheel units is controlled by an external pulse so that only one is activated at any given time. When reaching the activated offset thumbwheel setting, an offset key is created to reset flip-flop 30. This causes counter 10 to start counting to define a background cycle. After the counter counts to the number 99, a logic 1 is clocked into line 32 by a pulse in line 34. The next cycle length is then again started by an offset key in line 54.

As can be seen, lines *a*, *b*, receive different logic incremented by a percentage of the desired cycle length. This logic is then used by the program module C to produce outputs in the output control lines 152 which control output pins on the connector of coordinator A. The logic on input lines 144 can control the output logic. As discussed in connection with FIG. 2, each program module can be programmed to produce the desired outputs. In the module shown in FIG. 2, the upper two flip-flops produces either negative or positive pulses in a length controlled by two separate percentage settings. The lower two units can produce either one percentage pulses, signals having a desired percentage length, or combinations thereof. This shows the versatility of a program module constructed in accordance with FIG. 2. If each of the modules were constructed in accordance with the structure of FIG. 2, a variety of outputs could be obtained. It is also desirable to provide outputs which are pulses only. In that particular instance, the flip-flops controlled by thumbwheel units shown in FIG. 2 may be omitted from certain positions on the program module. These positions can be occupied by the circuit shown in FIG. 6 wherein the output NOR gate 140 has an input 142 connected directly with the output of a single thumbwheel unit. In the illustrated embodiment, thumbwheel unit V is employed. FIG. 6 also shows one operating advantage of requiring an input logic to activate an output for the coordinator. Assume that a function such as forcing phase B is desired. In that instance, when phase B is active, input 144 is true, logic 0, and gate 140 is unlatched. In that instance, at the percentage setting of thumbwheel unit V a pulse appears in line 95 and controls the output 152 and the logic on the connector pin associated therewith. Thus, if the phase B is active when a force phase B signal appears in line 95, a force signal M is created.

In practice, three program modules C are employed for each program in the coordinator. These modules are standardized and include certain combinations of the various output circuits as so far described. Thus, any variety of pulses and percentage signals can be created by using a selected combination of input terminals and output terminals. In the preferred embodiment, there are eighteen input and output channels, one-third of which are controlled by each of three separate program modules, only one of which is illustrated in FIG. 2. The connector, in practice, contains 18 input pins and 18 output pins connected to lines 144, 152, respectively.

The program modules can employ various other circuits which are of advantage in controlling certain traffic parameters at intersection TI, shown in FIG. 1. One of these arrangements is illustrated in FIG. 7 wherein AND gates 252, 258 have outputs 254, 256, respectively. These outputs are then connected to an OR gate 260 having an output R. A logic 0 on the enable line produces a logic 0 in line 256. This unlatches gate 260 so that it can be controlled with a logic in lines $\overline{A_1}$, $\overline{A_3}$. Thus, the output R is the ANDED function of the input logics, as shown in the lower graph in FIG. 7. Other similar arrangements can be used by incorporating into certain program modules AND gates and NOR gates for controlling the logic on the output pins of coordinator A.

Still another arrangement which can be incorporated into a program module is illustrated in FIG. 8. In this arrangement, a NOR gate 270 similar to gate 130 shown in FIG. 5 controls the tri state gate 110. Thus, a single pulse is obtained as discussed in connection with FIG. 6. A variation of this arrangement is shown in FIG. 9 wherein NOR gates 280, 282 are connected to the input of a tri state gate 110. Thus, gate 110 produces a 1% pulse at two separate positions in the background cycle, which function can be controlled by two separate thumbwheel settings.

Figure 2A:
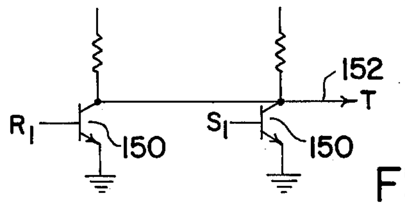
FIG. 2A is a schematic view of a wiring diagram ORing two outputs $R_1$ and $S_1$.

Two outputs can be ORed as shown in FIG. 2A, by combining transistors 150.

Various other combinations for the program modules can be used in accordance with the invention. It is seen that by using the particular concepts illustrated in FIG. 1 and the output concept shown in FIGS. 2, 6, 7, 8 and 9, a wide variety of modifications can be made within the program modules themselves to produce a variety of universally adjustable output pulses and signals. Each of the pulses can be adjusted in accordance with the percentage of the cycle length. This percentage length can be changed. The offset selection is used to shift the position of the cycle length and does not affect the operation of the output module during the cycle length timing function of counter 10. Other modifications could be incorporated into the illustrated embodiments as is clear from the various modifications discussed herein.

Having thus defined the invention, it is claimed:

1. A coordinator for creating a background cycle and controlled logic conditions on selected output circuits during said background cycle, said cycle and logic conditions being used in governing the signalization of a traffic intersection, said coordinator comprising: a pulse counter having an input means for receiving input counting pulses, a codeable output network for creating a coded binary pattern, means for changing said pattern incrementally and progressively between a first code representing a first number $N_1$ and a second code representing a second number $N_2$ upon receipt of input counting pulses at said input means, means for shifting said pulse counter to said number $N_1$ upon receipt of a shift signal and means for creating said shift signal when said pattern progresses to the number $N_2$; means for creating input counting pulses having a frequency corresponding to a desired cycle time; means for starting said counter upon receipt of an offset signal, said starting means includes a digital device for creating an offset signal at a selected time after a master synchronization pulse from a remote master controller; and decoding means for creating said selected logic conditions in selected output circuits when said pattern has a selected code corresponding to a number in the range of $N_1$ to $N_2$.

2. A coordinator as defined in claim 1 wherein said number $N_1$ is 0 and number $N_2$ is 99 and said pattern changing means includes means to increment by one between 0 and 99.

3. A coordinator as defined in claim 1 including means for creating said shift signal when said pattern has a code corresponding to the number $N_2$.

4. A coordinator as defined in claim 1 wherein said digital device includes a second pulse counter having an input means for receiving input counting pulses, means for incrementing said counter upon receipt of an input counting pulse, means for starting said second counter by said master synchronization pulse and means for creating said offset signal when said counter reaches a selected number and pulse means for directing pulses to said second counter.

5. A coordinator as defined in claim 4 wherein said pulse means includes means for creating pulses corresponding in frequency with said input counting pulses of said first mentioned counter.

6. A coordinator as defined in claim 4 wherein said digital device counts between a number corresponding to the number $N_1$ and a number corresponding to the number $N_2$.

7. A coordinator as defined in claim 6 wherein said pulse means pulses have the same frequency as said input counting pulses of said first mentioned counter.

8. A coordinator as defined in claim 4 wherein said pulse means pulses have the same frequency as said input counting pulses of said first mentioned counter.

9. A coordinator as defined in claim 1 wherein said decoding means includes several sensing means for creating an output signal when said binary pattern exhibits a selected number logic and means for creating a selected logic in an output circuit upon creating of said output signal.

10. A coordinator as defined in claim 9 wherein said output circuit includes a logic gate having a first input controlled by a first logic determined by the logic of said output signal, a second input controlled by a second logic on an enabling terminal on said coordinator and adapted to receive logic from externally of said coordinator and an output line connected to a terminal on said coordinator and having an output logic controlled by said first and second logics.

11. A coordinator as defined in claim 9 wherein first and second of said sensing means control the logic of a single output circuit and including a dual state logic device having an output connected to said single output circuit, a first means for shifting said output of said dual state logic device to a first binary logic and a second means for shifting said output of said dual state logic to a second binary logic opposite to said first binary logic, means for directing said output signal of said first sensing means to said first means and means for directing said output signal of said second sensing means to said second means.

12. A coordinator as defined in claim 9 wherein first and second of said sensing means control the logic on first and second output circuits, respectively, and including a dual state logic device having an output, a first means for shifting said output of said dual state logic device to a first binary logic and a second means for shifting said output of said dual state logic to a second binary logic opposite to said first binary logic; first connecting means for directing said output signal of said first sensing means to said first means; second connecting means for directing said output signal of said second sensing means to said second means; a first conductor means for connecting said first means to said first circuit; a second conductor means for connecting said output to said first circuit; a third conductor means for connecting said second means to said second output circuit; and, means for allowing selective interruption of said first or second conductor means.

13. A coordinator as defined in claim 9 including first and second of said sensing means and a logic gate in said coordinator, said gate having a first input means having a first logic controlled by the output signal of the first of said sensing means and a second input means having a second logic controlled by the output signal of the second of said sensing means and an output means for directing a logic to said output circuit and a third logic controlled by first and second logics.

14. A coordinator for creating a background cycle and controlled logic conditions on selected output circuits during said background cycle, said cycle and logic conditions being used in governing the signalization of a traffic intersection, said coordinator comprising: a pulse counter having an input means for receiving input counting pulses, a codeable output network for creating a coded pattern, means for changing said pattern incrementally and progressively between a first code representing a first number $N_1$ and a second code representing a second number $N_2$ upon receipt of input counting pulses at said input means; means for creating input counting pulses having a frequency corresponding to a desired cycle time; a decoding means for creating said selected logic conditions in selected output circuits when said pattern has a selected code corresponding to a number in the range of $N_1$ to $N_2$ and means for allowing one or more of said selected output circuits to be controlled by a given number in said range.

15. A coordinator as defined in claim 14 wherein said number $N_1$ is 0 and number $N_2$ is 99 and said pattern changing means includes means to increment by one between 0 and 99.

16. A coordinator as defined in claim 14 wherein said decoding means includes several sensing means for creating an output signal when said coded binary pattern exhibits a selected number logic and means for creating a selected logic in an output circuit upon creating of said output signal.

17. A coordinator as defined in claim 16 wherein said output circuit includes a logic gate having a first input controlled by a first logic determined by the logic of said output signal, a second input controlled by a second logic on an enabling terminal on said coordinator and adapted to receive logic from externally of said coordinator and an output line connected to a terminal on said coordinator and having an output logic controlled by said first and second logics.

18. A coordinator as defined in claim 16 wherein first and second of said sensing means control the logic of a single output circuit and including a dual state logic device having an output connected to said single output circuit, a first means for shifting said output of said dual state logic device to a first binary logic and a second means for shifting said output of said dual state logic to a second binary logic opposite to said first binary logic, means for directing said output signal of said first sensing means to said first means and means for directing said output signal of said second sensing means to said second means.

19. A coordinator as defined in claim 16 wherein first and second of said sensing means control the logic on first and second output circuits, respectively, and including a dual state logic device having an output, a first means for shifting said output of said dual state logic device to a first binary logic and a second means for shifting said output of said dual state logic to a second binary logic opposite to said first binary logic; first connecting means for directing said output signal of said first sensing means to said first means; second connecting means for directing said output signal of said second sensing means to said second means; a first conductor means for connecting said first means to said first circuit; a second conductor means for connecting said output to said first circuit; a third conductor means for connecting said second means to said second output circuit; and, means for allowing selective interruption of said first or second conductor means.

20. A coordinator as defined in claim 16 including first and second of said sensing means and a logic gate in said coordinator, said gate having a first input means having a first logic controlled by the output signal of the first of said sensing means and a second input means having a second logic controlled by the output signal of the second of said sensing means and an output means for directing a logic to said output circuit and a third logic controlled by first and second logics.

21. A coordinator for creating a desired background cycle time and controlled logic conditions on selected output circuits during said background cycle, said cycle and logic conditions being used in governing the signalization of a traffic intersection, said coordinator comprising: a pulse counter for counting between 0 and 99 upon receipt of counting pulses and having output means for creating a distinct signal upon counting to each digit in the range of 0 to 99, and means for controlling the frequency of said counting pulses to 100 divided by the time of a desired background cycle and decoding means for creating one of said logic conditions in one of said output circuits when said counter counts to selected ones of said numbers in the range of 0–99.

22. A coordinator as defined in claim 21 including means for starting said pulse counter a selected time after receipt of a master synchronization pulse from a remote master controller.

23. A coordinator as defined in claim 21 wherein said decoding means includes several sensing means for creating an output signal when said coded pattern exhibits a selected number logic and means for creating a selected logic in an output circuit upon creating of said output signal.

24. A coordinator as defined in claim 23 wherein said output circuit includes a logic gate having a first input controlled by a first logic determined by the logic of said output signal, a second input controlled by a second logic on an enabling terminal on said coordinator and adapted to receive logic from externally of said coordinator and an output line connected to a terminal on said coordinator and having an output logic controlled by said first and second logics.

25. A coordinator as defined in claim 23 wherein first and second of said sensing means control the logic of a single output circuit and including a dual state logic device having an output connected to said single output circuit, a first means for shifting said output of said dual state logic device to a first binary logic and a second means for shifting said output of said dual state logic to a second binary logic opposite to said first binary logic, means for directing said output signal of said first sensing means to said first means and means for directing said output signal of said second sensing means to said second means.

26. A coordinator as defined in claim 23 wherein first and second of said sensing means control the logic on first and second output circuits, respectively, and including a dual state logic device having an output, a first means for shifting said output of said dual state logic device to a first binary logic and a second means for shifting said output of said dual state logic to a second binary logic opposite to said first binary logic; first connecting means for directing said output signal of said first sensing means to said first means; second connecting means for directing said output signal of said second sensing means to said second means; a first conductor means for connecting said first means to said first circuit; a second conductor means for connecting said output to said first circuit; a third conductor means for connecting said second means to said second output circuit; and, means for allowing selective interruption of said first or second conductor means.

27. A coordinator as defined in claim 23 including first and second of said sensing means and a logic gate in said coordinator, said gate having a first input means having a first logic controlled by the output signal of the first of said sensing means and a second input means having a second logic controlled by the output signal of the second of said sensing means and an output means for directing a logic to said output circuit and a third logic controlled by first and second logics.

28. A coordinator for creating a desired background cycle time and controlled logic conditions on selected output circuits during said background cycle, said cycle and logic conditions being used in governing the signalization of a traffic intersection, said coordinator comprising: a pulse counter for counting between $N_1$ and $N_2$ in selected fixed increments upon receipt of counting pulses and having output means for creating a distinct signal upon counting to selected evenly distributed increments in the range of $N_1$ to $N_2$, and means for controlling the frequency of said counting pulses to determine the time length of a desired background cycle; decoding means for creating said selected logic conditions in output circuits when said counter counts to a selected increment in the range of $N_1$–$N_2$; and, means for allowing one or more of said output circuits to be controlled by a given incremented position in said range.

* * * * *